G. W. SWIFT, Jr.
MECHANISM FOR SCORING PAPER BOARD, PASTEBOARD, OR FIBER BOARD.
APPLICATION FILED JULY 17, 1918.
1,408,486.
Patented Mar. 7, 1922.
3 SHEETS—SHEET 1.
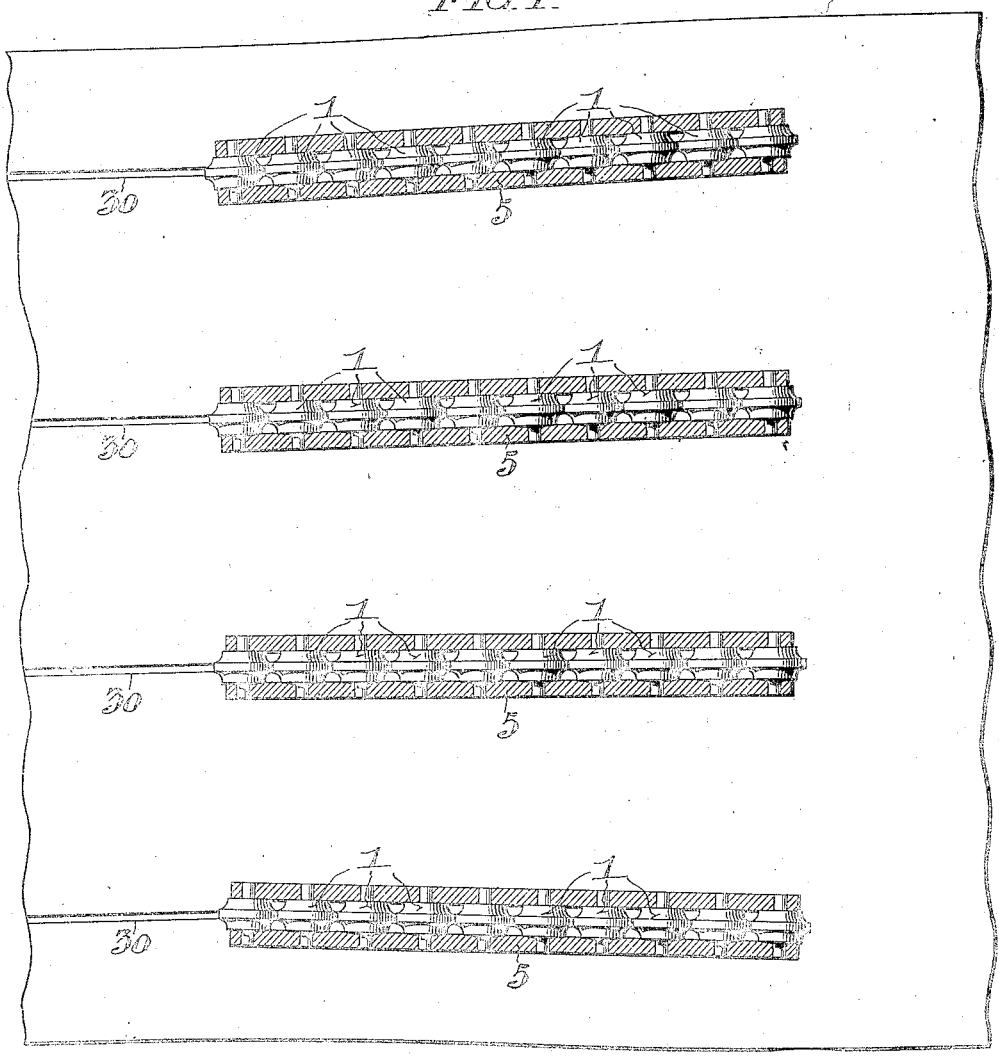
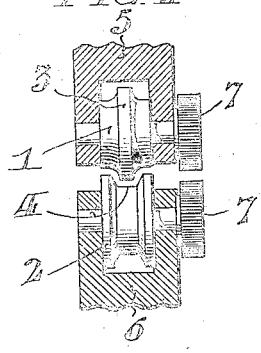

G. W. SWIFT, Jr.
MECHANISM FOR SCORING PAPER BOARD, PASTEBOARD, OR FIBER BOARD.
APPLICATION FILED JULY 17, 1918.
1,408,486.
Patented Mar. 7, 1922.
3 SHEETS—SHEET 2.
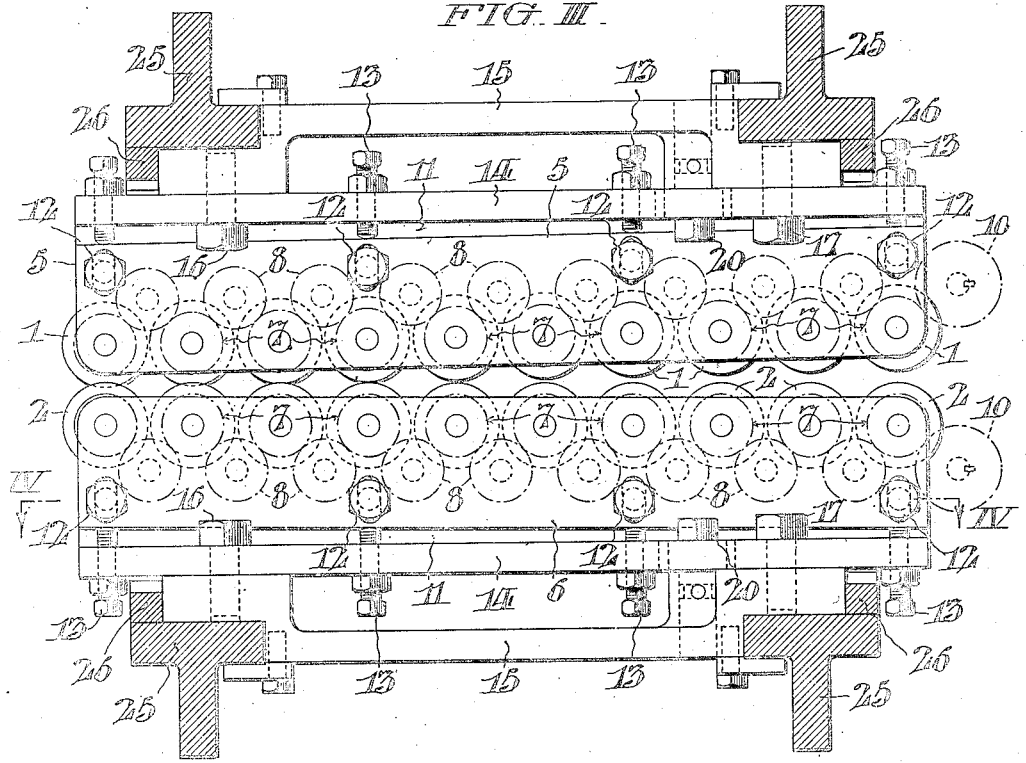
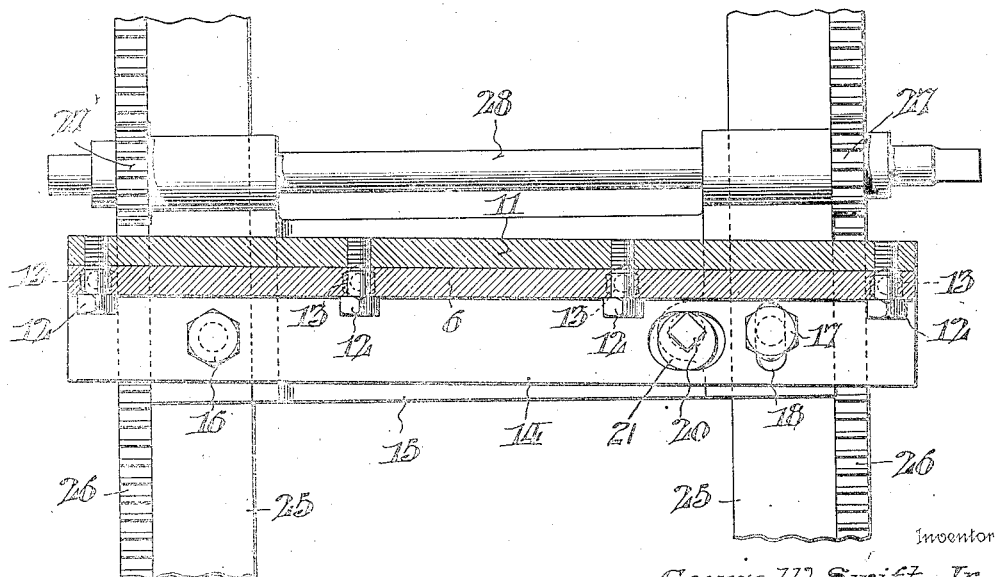

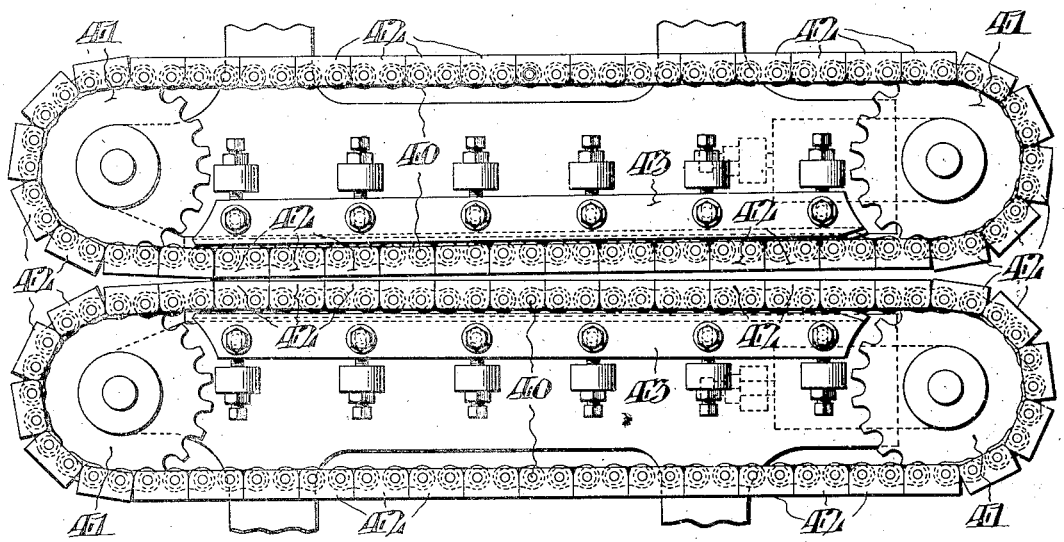
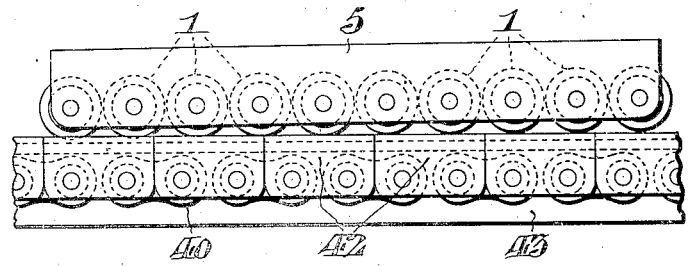
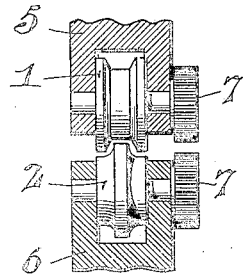
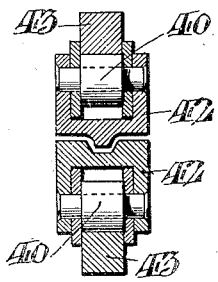
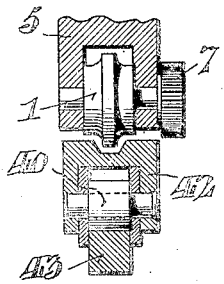

UNITED STATES PATENT OFFICE.

GEORGE W. SWIFT, JR., OF BORDENTOWN, NEW JERSEY.

MECHANISM FOR SCORING PAPER BOARD, PASTEBOARD, OR FIBER BOARD.

1,408,486.   Specification of Letters Patent.   Patented Mar. 7, 1922.

Application filed July 17, 1918. Serial No. 245,339.

*To all whom it may concern:*

Be it known that I, GEORGE W. SWIFT, Jr., a citizen of the United States, and a resident of Bordentown, in the county of Burlington and State of New Jersey, have invented certain new and useful Improvements in Mechanism for Scoring Paper Board, Pasteboard, or Fiber Board, whereof the following is a specification, reference being had to the accompanying drawings.

My invention relates to mechanism whereby paper-board which is to be folded into cartons or boxes, is initially scored preparatory to bending to form. The scoring is accomplished by opposing lines of paired rollers or similar instrumentalities with tongues opposed to grooves. For the proper attainment of this end, according to my invention, the rollers of the opposing lines are arranged so that each successive pair is slightly nearer together than the succeeding pair, so that the opposing lines approach each other, whereby the scoring is accomplished gradually as the board is passed through the rollers.

My invention further relates to mechanism whereby a series of parallel scorings may be impressed at the same time upon a single board. To accomplish this, a series of opposing lines of rollers or other instrumentalities such as I have referred to, are arranged in radial or fan-shaped relation to each other, so that as the board progresses through them, the scoring mechanisms approach each other to an extent sufficient to provide the necessary surplus material required for the formation of the scoring.

In the accompanying drawings, Fig. I, is a plan view illustrating diagrammatically the mechanism embodying my invention.

Fig. II, is a vertical sectional view showing the formation of a pair of scoring rollers.

Fig. III, shows the supporting and adjusting means for a single set of scoring rollers.

Fig. IV, is a horizontal sectional view along the line IV, IV, of Fig. III.

Fig. V, shows an alternative scoring mechanism in which sprocket chains carrying scoring blanks are employed in place of the series of rollers.

Fig. VI, shows another alternative construction in which a series of rollers is opposed by an endless sprocket chain with scoring blanks.

Figs. VII, VIII, and IX, are similar vertical sectional views of differing scoring mechanisms illustrating in the first case, the use of rollers in opposite relation to that of Fig. II; in the second case, the use of blanks opposed to blanks; and in the third case, of rollers opposed to blanks. Fig. IX, in particular, shows a cross section of the device illustrated in Fig. VI.

In the preferred form in which I will describe my invention, the scoring mechanism consists of a set comprising a line of upper rollers 1, 1, 1, and a similar line of lower rollers 2, 2, 2. The peripheries of the upper rollers 1, are provided with tongues 3, as shown in Fig. II, and the peripheries of the lower rollers 2, are provided with grooves 4. The line of rollers 1, is mounted in a housing 5, while the lower rollers are mounted in a similar housing 6. Each line of rollers is connected by means of pinions 7, and intermediate pinions 8, the geared series thus produced being driven at one end of the device by the driving gears 10, 10. Provision for the lateral shifting of the sets of scoring devices as hereinafter described without interference with their operation by the gears 10, 10, may be made in any well known manner: in order to render the drawing more instantly intelligible, in this regard, I have indicated a key-way and feather connection of the gears to their shafts.

The housing 6, is bolted against the vertical bracket 11, by bolts 12, passing through slots, whereby vertical adjustment is permitted, this adjustment being accomplished by bolts 13, set through the horizontal extension 14, of the bracket 11.

Said bracket is supported upon a movable carriage 15, and pivotally held thereto at one end by the bolt 16. It is also secured to the carriage at the opposite end by bolt 17, but with interposition of a slot 18, which permits the radial adjustment to which reference has been made. For convenience of accomplishing this, the bed carries a stud 20, carrying an eccentric 21, working in an aperture in the bracket extension 14.

A similar set of adjustments is provided for the upper housing 5, which need not be particularly described, being sufficiently shown in the drawings.

The carriage 15, rests upon parallel tracks or ways 25, 25, that are transverse to the direction of scoring and are provided with racks 26, 26, engaged by pinions 27, upon a shaft 28, carried in bearings formed upon one side of the carriage. It will, therefore, be seen that for each housing with its line of rollers, there is afforded, first, a capacity for bodily shifting sidewise, consisting in horizontal translation by rotation of the shaft 28 (here shown as squared at one end for the engagement of a suitable crank or key, in order to render the drawing more instantly intelligible in this regard); secondly, a capacity for radial adjustment, angularly with reference to the carriage 15 and the ways 25, in the direction of bodily shifting, by rotation of the stud 20; and thirdly, a capacity for vertical adjustment towards or away from its opposed line of rollers, which vertical adjustment permits of varying the inclination of the housing, so that one end of its line of rollers is nearer the opposite line than is the other end. These adjustments and the means therefor, are, it will be seen, independent of one another, so that each adjustment may be made without disturbance of the others. The vertical adjustment of the scoring lines of a set angularly or otherwise relative to one another and to the carriage 15 and the ways 25 is also independent of other sets.

Referring now to Fig. I, it will be observed that four sets of scoring mechanisms have been adjusted in position to simultaneously produce four parallel scorings 30, 30, 30, 30, in a single board at the desired distance from each other. In each scoring mechanism the housings have been adjusted vertically, so that the opposing lines of rollers where the board enters are further apart than where it leaves, thereby gradually increasing the depth of the scoring. It will also be seen that a radial adjustment of the mechanisms has been effected, so that they are in a fan-shaped relation to each other, by which means the required extra material is provided for the making of the scoring lines. By proper relative divergence (or convergence, if the matter be regarded the other way around) of the several scoring sets, accurate parallelism of the scoring lines can be secured. The lateral shifting and radial adjustments (above referred to) allow the distance apart and divergence of the scoring lines to be varied according to the character and thickness of the material operated on and the depth of scoring necessary in different kinds of work. The relations and action of the lines of scoring members of a set are quite different from what would be involved in mere crimping, since these lines are directly opposed to one another in position, instead of being side by side, and act in opposition to one another on opposite sides of the material operated upon.

Referring to Fig. V, it will be observed that a variant mechanism for producing the scoring is there shown. Instead of lines of rollers, sprocket chains 40, are mounted on sprocket wheels 41, every other link of the sprocket chains consisting of a scoring blank 42. The chains are supported during that portion of their travel where they are opposed to each other, by backing plates 43, with adjustments arranged to provide for the inclined or approaching relationship of the chains during this portion of their travel.

In Fig. VI, there is illustrated another variant mechanism in which rollers are employed for the upper scoring members and blanks on a sprocket chain for the lower scoring members, this being illustrated in cross section in Fig. IX.

In the modifications of Figs. VII, and VIII, the scoring is accomplished in a manner similar to that already described, i. e., tongues co-operating in opposition to grooves, and it is, of course, to be understood that these elements are mounted in identical supporting means capable of the several adjustments characteristic of my invention as hereinbefore noted.

In each instance, therefore, perfect scoring is accomplished through the compound adjustment of the scoring elements whereby the material incorporated in the crease is automatically compensated for.

Since my invention is capable of various modifications it is to be understood that I do not desire to limit myself to the precise forms herein illustrated.

Having thus described my invention, I claim:

1. In scoring mechanism, the combination of opposed lines of scoring members of which one line is provided with tongues and the other with grooves; means for maintaining opposed lines in inclined relationship to each other; and means for sidewise translation of opposed lines.

2. In a machine for producing parallel scorings, the combination of a plurality of scoring mechanisms, each comprising opposed lines of tongue and groove members; and means for adjusting and holding said mechanisms in convergent relation to each other.

3. In a machine for producing parallel scorings, the combination of opposed pivoted scoring members; means whereby said opposed members may be shifted about the pivotal axis in a direction at right angles to the scoring line; and means for setting them in desired position.

4. In a machine for producing parallel scorings, the combination of a plurality of scoring sets each comprising co-operating opposed lines of scoring members, with means permitting bodily shifting of said sets sidewise with reference to one another;

and means, independent of the means aforesaid, for adjusting and maintaining said sets in various relations of convergence to assure parallelism of the scorings produced in different kinds of work.

5. A scoring machine comprising a plurality of scoring sets each with cooperating opposed lines of scoring members, with means permitting bodily shifting of said sets transversely with reference to the direction of scoring; means independent of the means aforesaid for adjusting said sets angularly with reference to one another in the direction of bodily shifting; and means for adjusting the lines of each set vertically with reference to one another, independently of other sets.

6. A scoring mechanism or set comprising co-operating opposed lines of scoring members, one line consisting of groove members and the other of tongue members directly opposite the groove of the first mentioned line, at least one of said lines being in the form of a sprocket chain whose links constitute its scoring members.

7. A scoring mechanism or set comprising cooperating opposed sprocket chains whose links comprise scoring members, one chain having groove members and the other chain having tongue members directly opposite the grooves of the first-mentioned chain.

8. A scoring machine comprising ways transverse to the direction of scoring, a carriage shiftable along said ways, and a line of scoring members on said carriage angularly adjustable with reference thereto and to said ways.

9. A scoring machine comprising ways transverse to the direction of scoring, a carriage shiftable along said ways, a line of scoring members on said carriage angularly adjustable with reference thereto and to said ways, and means for clamping said line in adjusted position.

10. A scoring machine comprising ways transverse to the direction of scoring, carriages shiftable along said ways, and opposed lines of scoring members on said carriages angularly adjustable with reference thereto in the direction of movement of the carriages on the ways.

11. A scoring machine comprising ways transverse to the direction of scoring, carriages shiftable along said ways, and opposed lines of scoring members on said carriages, one of said lines of scoring members being vertically adjustable with reference to its carriage and to said ways.

12. A scoring machine comprising ways transverse to the direction of scoring, a carriage shiftable along said ways, a bracket on said carriage angularly adjustable with reference thereto in the direction of movement of the carriage on the ways, and a line of scoring members on said bracket vertically adjustable with reference to said ways.

13. A scoring machine comprising ways transverse to the direction of scoring, a carriage shiftable along said ways, a bracket on said carriage angularly adjustable with reference thereto in the direction of movement of the carriage on the ways, a line of scoring members on said bracket vertically adjustable with reference to said ways, and means for clamping said bracket to said carriage and for clamping said line to said bracket.

In testimony whereof, I have hereunto signed my name at Bordentown, New Jersey, this 13th day of July, 1918.

GEORGE W. SWIFT, Jr.

Witnesses:
 CHAS. ROSSEEL,
 J. H. LONGSTREET.